United States Patent

Leblond et al.

[15] 3,654,828
[45] Apr. 11, 1972

[54] TIRE BUILDING MACHINE

[72] Inventors: Jean Leblond; Jean Biet; Guy Danneels, all of Compiegne, France

[73] Assignee: Uniroyal Englebert France S.A., Neuilly-sur-Seine, France

[22] Filed: Aug. 5, 1970

[21] Appl. No.: 61,285

[30] Foreign Application Priority Data

Aug. 6, 1969 France..................................6927064

[52] U.S. Cl....................................83/23, 83/112, 83/154, 83/267, 83/276, 83/282, 83/614, 226/93
[51] Int. Cl. ..........................................B26d 5/20, B26d 5/42
[58] Field of Search................83/23, 28, 112, 154, 266, 267, 83/276, 282, 171, 614, 922; 226/93, 183

[56] References Cited

UNITED STATES PATENTS 2,598,451 5/1952 Simpson ..................................226/93
2,837,331 6/1958 Feick.......................................226/93

Primary Examiner—Andrew R. Juhasz
Assistant Examiner—David R. Melton
Attorney—Henry Sternberg

[57] ABSTRACT

The invention contemplates an improved structure and method for building breakers or belts for vehicle tires, through precise pre-cutting of ply strips from web material and precise transfer to a breaker-building drum. Pre-cutting to length is accomplished by a ply-preparation device which includes a continuous and endless surface for supporting the lead strip in transiently adhered relation to said surface, plus means for the precise indexing displacement of the strip-laden surface to measure the predetermined ply length to be severed upon cut-off. Means are disclosed for the stress-free transfer of the severed ply strip and for the automatic recycled measurement and cut-off of the next ply strip. Means are also disclosed for the interlaced delivery of such plies from successive different stations to accomplish desired multiple-ply building of a particular breaker on the same drum, and for tread-application as part of the same machine cycle.

16 Claims, 20 Drawing Figures

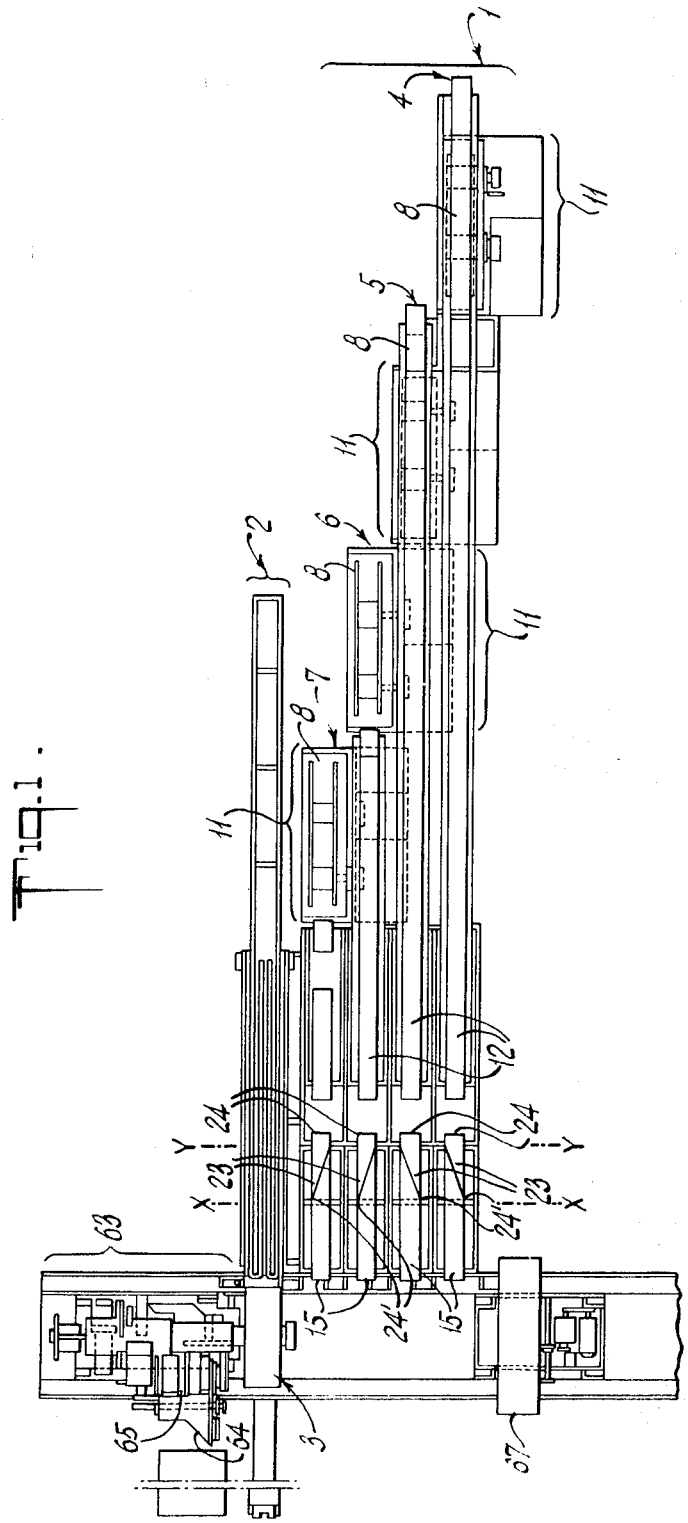

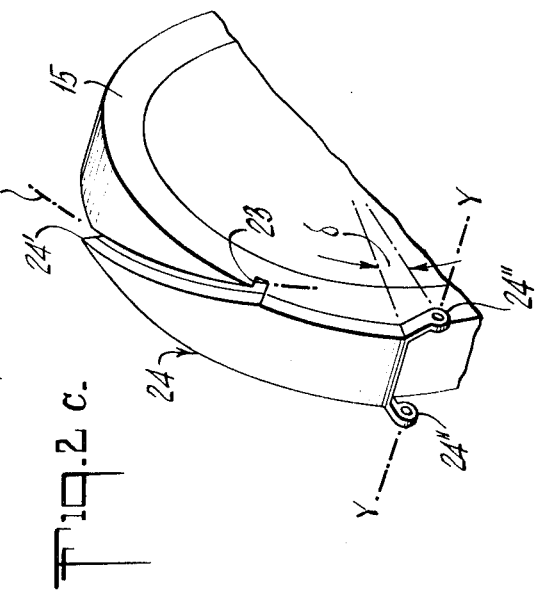
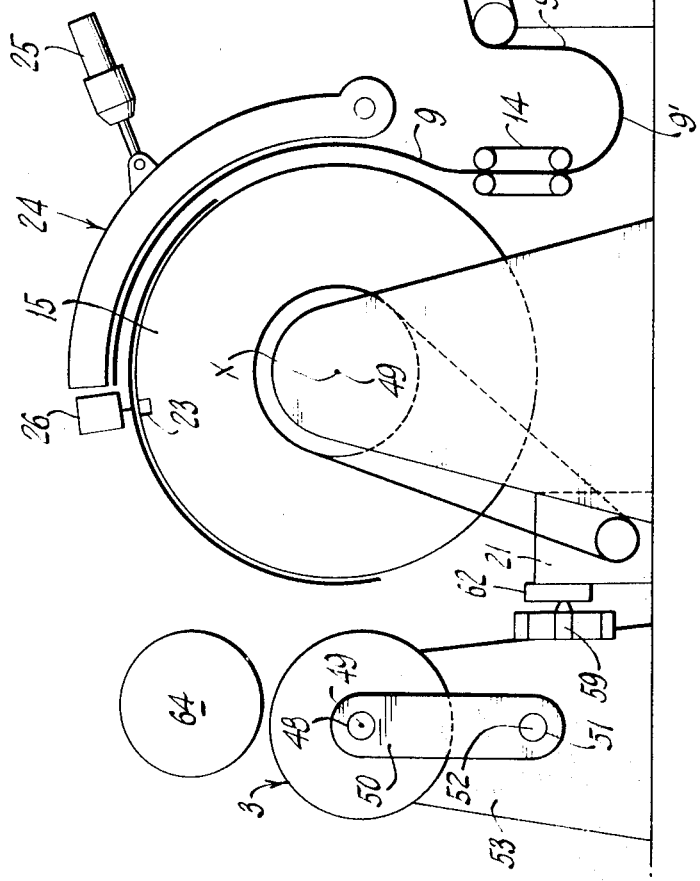

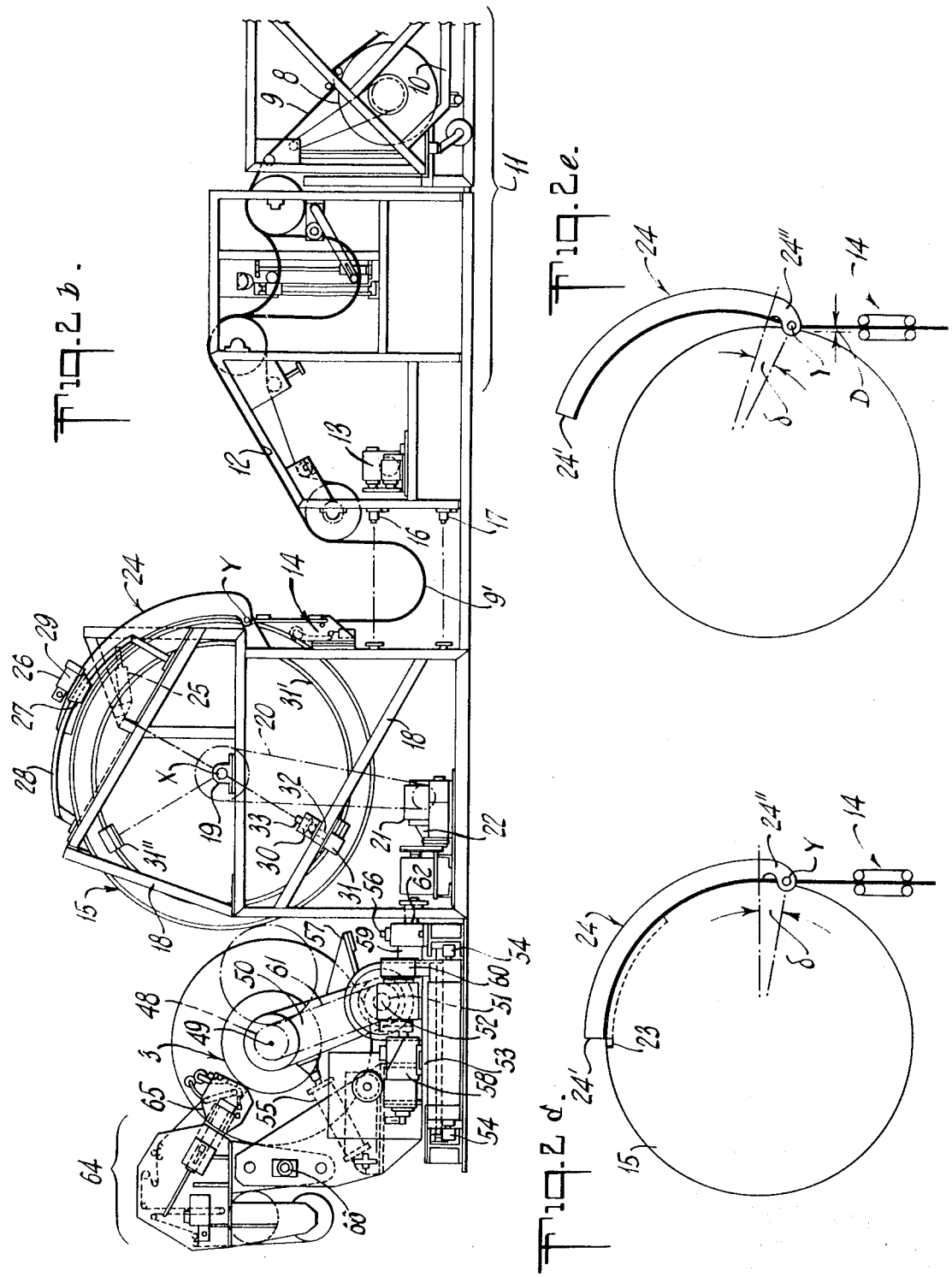

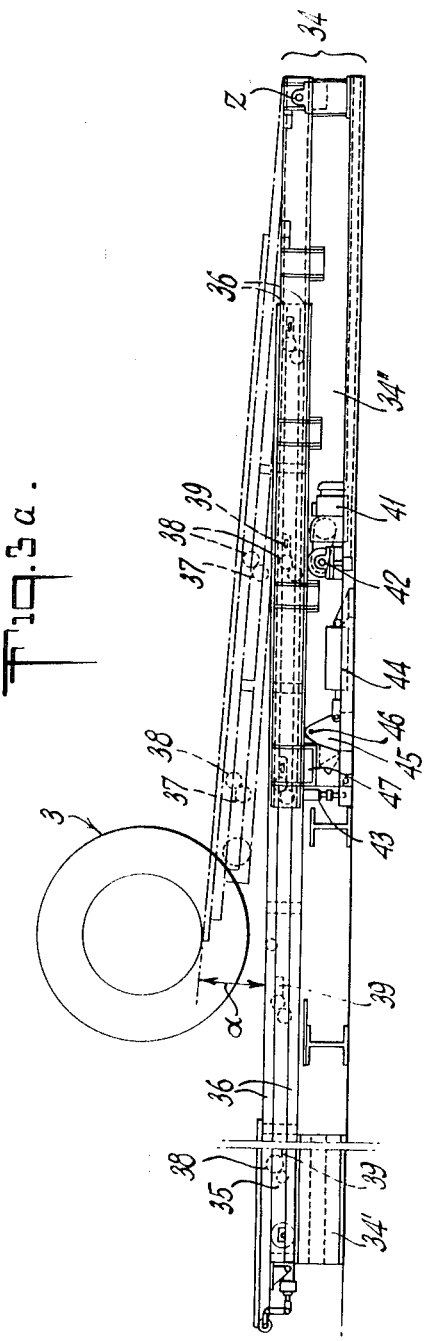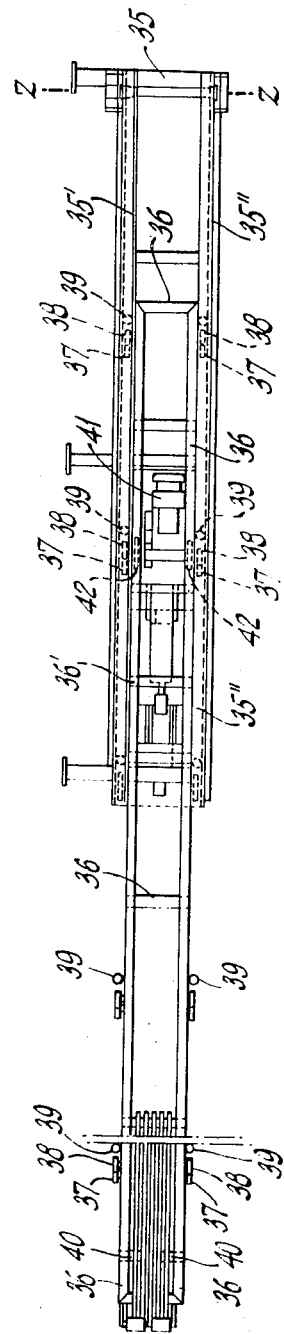

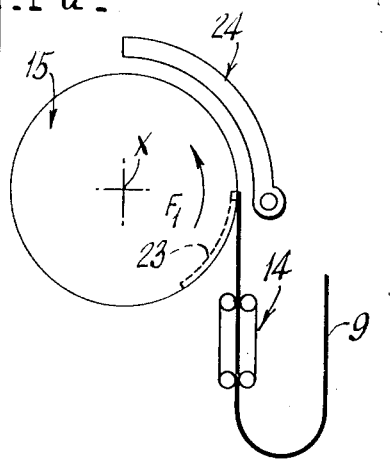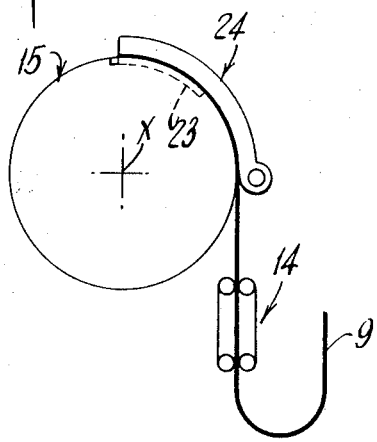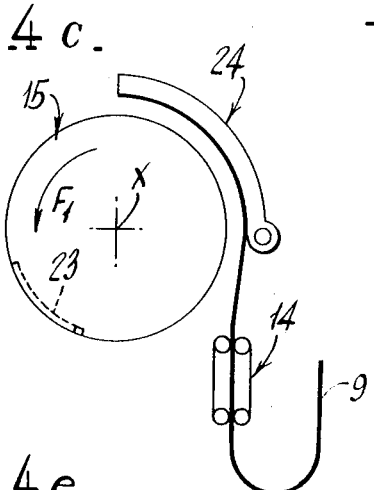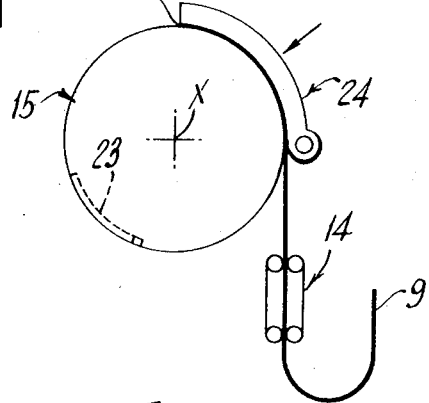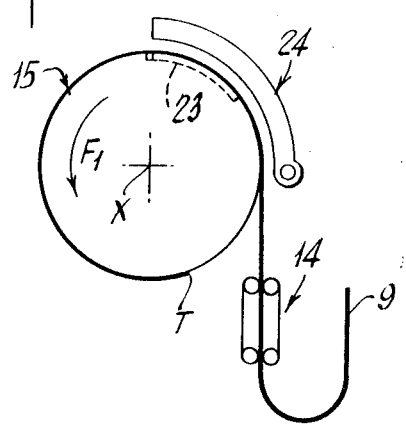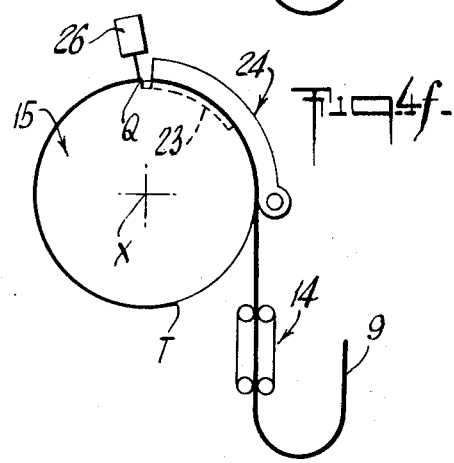

TIRE BUILDING MACHINE

The present invention relates to an improved automatic means for making complete breakers or casing belts for pneumatic tires and its applicable in particular to the production of belts with a large number of metallic plies, as in the case of casings designed for "heavy duty" vehicles.

The prior art includes machines for the automatic production assembly of complete tire-casing belts, that is to say, belts comprising one or more plies of wires or textiles superposed in several layers of plies, the outer ply being surrounded by the tread of the tire. We know, in particular, in this field, of the production-assembly of belts with wire plies described in U.S. application Ser. No. 749,810, filed Aug. 2, 1968, now U.S. Pat. No. 3,547,732 and in U.S. Application Ser. No. 764,664, filed Oct. 3, 1968, now U.S. Pat. No. 3,591,439. Although such machines can precision-produce the belts, their field of application is limited, practically, to that of belts with only two metal plies; in other words, such machines are applicable only to the production of belts for tire casings designed for relatively light vehicles, such as, for example, passenger cars.

The present invention provides for improved automatic assembly of tire-casing belts, in such manner as to obtain complete belts with more than two metal plies while maintaining strict precision, particularly in regard to (a) cutting the plies, (b) applying the plies and the tread with respect to the median plane of the belt, and (c) maintaining constant tension and pressure on the means uniting these various elements, in the course of building the breaker.

Automatic tire casing belt production according to the invention importantly comprises, in combination:

At least one apparatus for preparation of belt plies from a continuous ply web, and for applying said plies on a belt-production drum or pulley;

Apparatus for supplying treads, previously cut to length, to the belt-production drum, and for applying said treads to the belt of plies carried by said drum; and A cylindrical drum for building complete belts, operative successively with each of the devices for preparation of plies, and with the device for feeding and applying the said treads.

According to other features:

The belt-production or building drum is rotatable about a horizontal axis, and is mounted on a support that is movable both in translation parallel to the axis of the drum and in rotation about an axis parallel to the drum axis, the support moving between two extreme positions; one of these positions is the working position, in which the drum cooperates with one of several ply-preparation devices, and the other of these positions is the retracted position;

The ply-preparation device comprises, in combination, a device for storage and discontinuous feed of a web of plies cooperating with web-positioning means, and with a wheel having a cylindrical rim, receiving the ply web as it leaves the positioning means, and preparing belt plies from the said web, the said wheel being rotatable around an axis parallel to that of the building drum, said wheel including means for locating and locking the same in at least one predetermined position, for local coaction with means for cutting the ply web; and means supporting the said web cooperates with the latter to hold it away from the ply-preparation wheel during the application of a ply on the building drum;

The device for supplying and applying treads to the building drum comprises a rectilinear tread support, axially displaceable in a fixed horizontal direction orthogonal to that of the axis of the building drum and, in a predetermined stopped axial position, pivotable about a fixed axis parallel to that of the building drum; such rotation is between two angular limits, the first of which corresponds to that for which the rectilinear support is axially displaceable, and the second of which corresponds to that in which the supported tread is tangent to the belt of plies on the building drum, and at a time when the median plane of the latter coincides with the median plane of the tread;

The movable support for the building drum cooperates with means locating and locking the said support when the drum cooperates with a ply-preparation wheel or with tread-application device;

The building drum is axially movable with respect to its support, between two predetermined and adjustable extreme positions, when the latter is in locking position;

The building drum is of the type comprising throat elements, retractable radially in synchronism;

The cylindrical throat of the building drum is covered with a permanently magnetized magnetic material, the said material creating a magnetic field that is substantially uniform over the whole perimeter of the throat;

The cylindrical rim of the belt ply preparation wheel is covered with permanently magnetized magnetic material, creating a magnetic field that is substantially uniform over the whole perimeter of said rim, the latter field substantially matching the field prevailing over the perimeter of the building drum;

The ply-preparation wheel cooperates with at least one locking means in at least one predetermined position of said wheel, namely, the ply web cutting position;

The rim of the ply-preparation wheel has a groove helically inclined with respect to the generatrices of the rim;

The knife of the ply-cutting means comprises a blade of suitable shape, held at a predetermined temperature which is functionally related to the characteristics of the gum coating on the ply wires or cables;

The knife of the ply-cutting means is supported on a slide or carriage, movable along a guide rail parallel to the groove in the ply-preparation wheel, when the latter is locked in the ply web cutting position; and the knife is movable with respect to its support carriage in a direction perpendicular both to its guide rail and to the surface of the rim of the ply-preparation wheel;

The means supporting and holding the ply web outside the ply-preparation wheel comprises a shoe pivotable about a fixed axis parallel to the axis of the said wheel, between two extreme positions, the first corresponding to contact between the shoe and the wheel, and the second involving shoe retraction away from the wheel; the shoe has in inner face that is concave and generally cylindrically arcuate, with the same radius as the wheel and with a central included angle of substantially 90°; the said inner face is provided with electromagnets whose field can assume two levels only, one substantially zero, the other greater than the strength of the fixed magnetic field at the perimeter of the ply-preparation wheel, and said shoe locally conforms substantially to the contour of the ply-preparation wheel when in the first of its extreme positions, in which position a truncated lateral wall of the shoe terminates in a point and registers with the inclined groove in the ply-preparation wheel;

Rotary drive means for the building drum cooperates with rotary drive means for the corresponding ply-preparation wheel, when the support of the said building drum is locked with respect to the said ply-preparation wheel, and when the same building drum is in the correct working position for the particular ply-preparation wheel; at this time, the peripheral speeds of the wheel and drum are equal in magnitude and opposite in sign.

Advantageously, the support for the building drum comprises a device for application of strips to the drum when the drum is in its retracted position.

Preferably:

The building drum comprises, on one of its throat elements, a permanent magnet, the pole faces of which are flush with the surface of the throat and the magnetic field of which has a strength greater than that of the magnetic field on the perimeter of the ply-preparation wheel, the said permanent magnet being directly opposite the corresponding ply-preparation wheel, when the building drum has just been brought into working position;

The ply web storage and feeding means of each ply-preparation device is of the type comprising a web bobbin holder case, removable and replaceable automatically, and an automatic feed device;

The ply web positioning means for each ply-preparation device includes belt-centering means;

Each ply-preparation device comprises web-supply means including an endless conveyor belt, located between the outlet of an automatic ply-web pay-out device and the location of web-entry into the centering means.

Other characteristics and advantages of the invention will appear more clearly in the description below, in reference to the accompanying drawings, in which:

FIG. 1 is a simplified plan view of mechanism for tire casing belt production according to the invention;

FIG. 2a is an enlarged view in side elevation, schematically showing part of the belt ply preparation device, forming part of the said assembly of FIG. 1;

FIG. 2b is a view similar to FIG. 2a to show greater detail;

FIG. 2c is an enlarged, simplified, fragmentary perspective view of shoe and wheel parts of the ply-preparation device;

FIGS. 2d and 2e are simplified side views of the shoe and wheel parts, for the respective operable positions of the shoe;

FIGS. 3a and 3b are, respectively, a view in side elevation and a plan view of apparatus for application of treads on the plied belts, said apparatus forming part of the machine of FIG. 1; and FIGS. 4a to 4l, inclusive, are like simplified side views of the belt ply preparation structure, showing parts in various relative positions, to illustrate a cycle of preparation of a belt ply.

GENERAL DESCRIPTION OF THE MACHINE

Figure 4G:
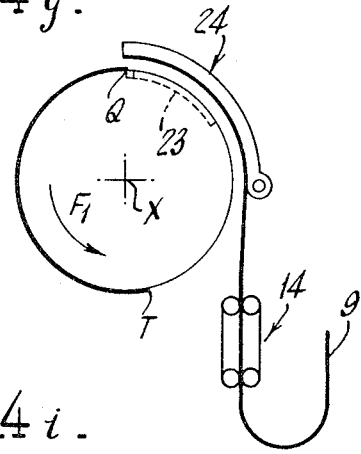
Figure 4H:
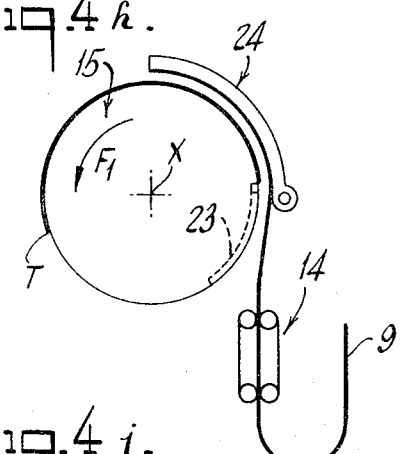

In accordance with the invention, and referring to FIG. 1, manufacture of breakers or tire-casing belts of the invention utilizes: first, a sub-assembly 1 of belt ply-preparation devices; second, a sub-assembly 2 for tread supply and application; and, third, a drum 3 for building belts from components furnished by the preceding two sub-assemblies. The first sub-assembly 1 of devices may consist of as many belt-ply preparation devices as there are plies in the casing, but it can also comprise a lesser number if, among them, two or more of the plies are identical. The apparatus shown, by way of example, consists of the four belt-ply preparation devices 4, 5, 6 and 7. These devices all have like components; it therefore suffices to describe the ply-preparation device 7 by way of example.

In FIGS. 2a and 2b, a belt ply preparation device is seen to comprise means 8 storing ply web 9; the storage means 8 may be a reel carried by a movable frame or support 10. Storage means 8 forms part of a station 11 for unwinding the said web; station 11 also includes a conveyor 12 for the ply web, such as, for example, a conveyor belt driven by a motor unit 13. Conveyor 12 delivers web from the unwinding station, to web-positioning means 14 serving a ply-preparation wheel 15; a wheel 15 is rotatable on the fixed axis X—X.

Advantageously, the unwinding station 11, including movable frame 10 and reel 8, further includes a reel-winding and/or unwinding device having a quick-acting clutch, as described in U.S. application, Ser. No. 750,994, filed Aug. 7, 1968, now U.S. Pat. No. 3,498,555, and the positioning means 14 comprises a web-position adjustment device with a centering feature, as more fully set forth in U.S. application, Ser. No. 644,175, filed June 7, 1967 now U.S. Pat. No. 3,547,286.

The means thus far identified, namely, the storage reel 8 for ply web 9, the various rollers of the unwinding station, conveyor 12 and the centering device 14, are disposed in such a way that their median planes all coincide with that of wheel 15; the median plane of the web is thus kept substantially in the common median plane of the web-supporting devices until it reaches the centering means 14, so that the median plane of web leaving the centering device 14 may be precisely located. Further, the centering device 14 is preferably oriented so that web 9 passes through it vertically upward; and conveyor belt 12, on the other hand, is preferably so inclined at a location laterally offset from wheel 15 that web 9, between the outlet from the said conveyor and the input of the centering device, may form a compensating loop 9'. As indicated schematically in FIG. 2b, the bottom of loop 9' is automatically maintained between two extreme positions controlled by detection means 16 and 17 such as, for example, light-sources and photoelectric cells in circuits connected to operate drive-control means for motor 13.

The support shaft for wheel 15 rotates on axis X—X in journals 19 secured to frame 18. This shaft may be rotated by flexible means 20, such as a chain or belt, driven by the drive shaft of reduction gearing 21 which, in turn, may be driven by a motor 22, or as we will see below, by the motor of the motor-reducer unit of the building drum 3.

The periphery of wheel 15 is characterized by circumferential grooves, regularly spaced along planes of cross section; these grooves are filled with an elastomeric material which is permanently magnetized, such material being advantageously a product known by the trademark "Ferriflex." It will be understood that when the grooves have been filled and the periphery of the wheel has been coated with such magnetized material, the outer surface will be a cylinder about the axis X—X. Additionally, the rim of the wheel has a groove 23 passing through it from one edge to the other, on a ply cut-off biased alignment (see FIG. 2c), as will later be more fully explained.

A shoe 24 on the frame 18 supporting the shaft of wheel 15 functions to apply the ply web onto the said wheel. Shoe 24 is pivotable about an axis Y—Y parallel to axis X—X of wheel 15; Y—Y may thus designate a shaft fixed to shoe 24 and may thus in turn be rotatable in journals fixed to frame 18. The concave inner face of shoe 24 is formed as a cylindrical arc having the same radius as that of wheel 15, and having an arcuate extent of substantially a right angle. The inner face of shoe 24 is provided with electro-magnets, all preferably identical in dimensions and magnetic characteristics, and having pole faces so disposed that the said inner face forms a continuous cylindrical surface. Alternatively, the inner face of shoe 24 may be provided with permanent magnets having suitable wire coils cooperating therewith for selectively carrying a current to demagnetize the latter permanent magnets, when desired. Additionally, the end of shoe 24 opposite its axis of rotation is truncated with a helical taper or wedge-shape and terminates in a point 24', the form of this wedge being such that, with wheel 15 locked in a suitable position and with shoe 24 applied to wheel 15, the lateral wall of the wedge aligns or is flush with the groove 23, i.e., the edge of this wall applied on the rim of wheel 15 matches the alignment of groove 23 (see FIG. 2c), and this alignment matches the biased direction of the metal wires or cables in the ply-web material.

Shoe 24 is connected to the end of the rod of a jack or actuator 25, which may be fluid-pressure operated, as for example, by compressed air, the body being articulated to frame 18. The extreme positions of the jack rod will be understood, respectively, to be the position in which the inner surface of the shoe is substantially in contact with the surface of the rim of the wheel, and the position in which the shoe is retracted away from the wheel.

A cutting device 26 is positioned adjacent to the wedge-shaped end of shoe 24 remote from the pivot axis Y—Y. This cutting device consists of a heated knife on a carriage or slide 27, movable automatically along an arcuate guide or rail 28 fixed to frame 18. Carriage 27 includes a frame carrying a drive motor 29 as well as a jack, having an actuator or rod end (movable in a radial plane of the wheel) connected to the heated knife. The radial component of knife movement is suitably driven and is determined by two guide rods fixed to the body of the knife and sliding in a guide block fixed to the carriage; at the same time, the knife carriage 27 is driven along the guide rail 28 by a rack-and-pinion drive, as for example by chain or belt transmission from the output shaft of motor 29 to a driven shaft on the carriage, the said driven shaft being perpendicular to the guide rail and carrying a pinion meshed to a rack on the guide rail. The heated knife comprises a heat-regulating device enabling it to retain a constant temperature, so selected that the knife is hot enough to penetrate into the gum of the ply web without the necessity of exerting too much force; at the same time, the knife is cool enough to avoid vulcanizing any gum on the edges of the cut during the cutting operation.

Wheel 15 can be locked in a position corresponding to the cutting position, in which the heated knife is opposite the biased groove 23 in the periphery of the wheel. Such locking can be obtained by means of a suitable known device 30, as, for example, by a locating block 31 fixed to a side of wheel 15 and having a concave-conical opening or socket in which the displaceable locking-pin end 32 of a frame-referenced jack or actuator 33 can enter, the said locking-pin end 32 having a convex-conical shape matching that of the concave-conical opening.

The locating block 31 is shown to be adjustably secured at one angular location along a rail, flange or groove 31' forming part of a side of wheel 15; another such block 31", adjustably securable at a different angular location along means 31', permits locking by pin 32 to precisely determine another angular location. As is later explained, the angular displacement between wheel-locating positions of blocks 31" and 31 determines the precise length of a ply strip, and the angular separation is fixed when the machine is initially set up, for producing ply strips of then-required length.

The subassembly 2 for application of treads may be of the type described in U.S. application, Ser. No. 740,209, filed June 26, 1968, now U.S. Pat. No. 3,547,286 but it can also be advantageously replaced by apparatus described below, of less lateral bulk than that of said application. In FIGS. 3a and 3b, this apparatus is seen to include a chassis 34 composed of two parts 34' and 34" disposed respectively on opposite lateral sides of the zone of axial displacement of the building drum 3, the part 34' (only partly illustrated in FIGS. 3a and 3b) being positioned away from the said zone with respect to the belt-ply preparation device, and the part 34" being placed adjacent this zone, that is to say, on the same side as the belt-ply preparation device. On part 43" is mounted a beam 35 with two upper flanges or rails 35' and 35", the beam being elongated perpendicular to the longitudinal axis of the building drum. Beam 35 may be elevated about a fixed pivot axis Z—Z, perpendicular to and substantially intersecting its longitudinal axis; axis Z—Z is located at the end of beam 35 opposite drum 3, the other end of beam 35 being substantially tangent to said drum when the beam is elevated.

On beam 35 is mounted an auxiliary or movable beam 36, with the same longitudinal axis as beam 35 and having (as with beam 35) two upper flanges or rails 36' and 36". Beam 36 is movable along beam 35 between two extreme positions. At a first of these positions, the left end of beam 36 is positioned at part 34' of chassis 34, while the right end of beam 36 is intermediate the ends of beam 35; at the second of these positions, the same left end overlaps beam 35 while the right end of beam 36 projects beyond axis Z—Z and away from beam 35.

Beam 36 carries, on each of the faces of its flanges 36'-36", longitudinal guide rollers 37-38 riding tracks formed on the flanges of beam 35, as well as transverse guide rollers 39 which also engage beam 35. Beam 36 also carries (at its left end) support rollers riding horizontal elements of part 34' of chassis 34. A motor-reducer unit 41 is mounted on part 34" of the same chassis, to drive two rollers 42 having treads of high friction coefficient. The lower flanges of beam 36 rest on these treads, so that beam 36 can be longitudinally positioned, by the friction drive. In addition, beam 36 can be fixedly held in a given longitudinal position with respect to beam 35; for this purpose, a locating and locking device 43 is carried on beam 35. The locating and locking device 43 may comprise a fluid-pressure operated jack or actuator, having a body fixed to beam 35 and having a vertical actuator rod or pin engageable in a mating aperture in beam 36. The location of such opening is selected to permit immobilization of beam 36 with respect to beam 35 when beam 36 is in a third or intermediate position, between the end positions described above, being a position which can be termed the "prepositioning" location.

Rotary motion of beam 35 about axis Z—Z is obtained by fluid-pressure operated means such as a jack 44 having a body articulated to part 34" of chassis 34; the rod of jack 44 is connected to drive a lever or bracket 45. The rotary axis 46 of the lever or bracket 45 is fixed on chassis 34, and the actuating end thereof is in contact with a lug or cross member 47 fixed to beam 35.

Thus, the stroke of the rod of jack 44 causes pivoted elevation of beam 35, and, consequently, of beam 36, over an angle α of predetermined extent.

Beam 36 carries a fixed support designed to receive a tire tread previously cut to the desired length, and of desired profile.

The treads are placed on this support by an operator, when beam 36 occupies the first end position defined above. Beam 36 can then be displaced along its axis, by means of the friction drive device described above, into the second end position defined above. In this second end position of beam 36, the way is clear for drum 3 to be brought into position to receive the tread; when drum 3 is thus positioned, beam 36 is horizontally displaced toward the drum, to its "prepositioning" location, intermediate the above-noted two end positions; at the "prepositioning" location, the left end of beam 36 is substantially "flush with" or directly below the axis of drum 3. Also, in the "prepositioning" location, the beam 36 is locked to beam 35 by the locking means 43, thus permitting the median plane of the tread to be made to coincide exactly with the median plane of drum 3, when positioned to receive the tread. Upon then upwardly pivoting beam 35 to the angular extent α, the corresponding end of the tread comes into tangential contact with the outer ply of the belt carried by drum 3. The drum is then driven in rotation about its axis, thus drawing the tread onto the drum as the remainder of the tread slides longitudinally along its support; one revolution applies the tread to the outer ply of the belt already wound on the drum, as will be understood.

When the application of the tread on the building drum is complete, beam 35 is pivotally retracted or lowered, back to its horizontal position, the sliding beam 36 being thus returned empty into it intermediate ("prepositioning") position defined above, whereupon the locking means 43 is disengaged and beam 36 is displaced to its second end position to clear the way for axial displacement of drum 3. After drum displacement, beam 36 is returned to its first end position, to receive another tread.

In FIGS. 2a and 2b, the building drum 3 is seen to be mounted on a shaft 48, on a horizontal axis 49 about which it is rotatable. Shaft 48 is carried at the movable end of a pivot arm 50, fixed to a shaft 51 on a horizontal axis 52. Shaft 51 is mounted on a slide 53 guided for horizontal displacement along axis 52, as determined by guides 54. Arm 50 is connected to the actuator rod of a fluid-pressure operated jack 55, the body of which is articulated to part of the slide structure 53. The rod of jack 55 pivotally actuates the drum-positioning arm 50 about axis 52; it thus positions drum 3 (about this same axis) between two positions, one being the retracted position of the rod of the jack (represented by solid outline in FIG. 2b) and the other being a forwardly projected position, the extent of projection being dependent upon the loaded condition of the ply-preparation apparatus with which drum 3 is cooperating; the extent of forward projection is such that when drum 3 is cooperating with one of the wheels 15, the distance separating the surface of the rim of the wheel 15 from the surface of the throat of the drum 3 will be equal to the thickness of the belt plies already carried by the drum, plus the thickness of the ply then carried on the wheel, in readiness for application to the layer of plies already on the drum.

Drum 3 occupies its first limited position, not only when it is simply in retracted position, but also during application of additional component material in a strip, as will now be explained.

The stroke of jack 55 in extended position is limited by a adjustable stop 56, when intercepted by a bracket 57 fixed to arm 50; for each wheel 15, this arrangement permits precise and independent adjustment of the working position of the building drum. The axial displacement of the slide 53 which carries the building drum is obtained by means of an electric motor-reducer unit 58 which drives pinions moving on fixed elongated racks. Through this movement, drum 3 may be selectively positioned opposite each particular wheel 15, and in particular to align each such position with the applicable median plane; to obtain this result with maximum precision, a locking and centering device 59 is fixedly carried by slide 53, and the device 59 may comprise a tapered pin locating in a similarly tapered socket fixedly carried by the frame 18 which supports the ply-preparation wheel or wheels. Rotary drive for the drum 3 may be provided by a electric motor-reducer unit 60, driving a sprocket wheel having chain-transmission connection at 61 to a sprocket wheel secured to the shaft 48 of drum 3. The output shaft of motor-reducer unit 60 may be connected to the motor shaft of the motor-reducer unit 21, which drives the selected particular ply-preparation wheel 15, by a clutch 62, thereby establishing direct drive of the motor shaft of unit 21 from the output shaft of unit 60; at the same time, drum 3 is brought into its second limited position, i.e., to its position of working with the corresponding wheel 15, as defined above, at which point the device 59 is actuated to lock slide 53, and to establish the indicated clutch connection.

Mechanism 63 enables further axial-positioning adjustment of drum 3, with respect to its supporting slide 53. Such provision for further axial displacement permits side-by-side placement, at the same ply level of the belt, of two plies delivered by a single wheel 15, while keeping the slide 53 in a given locked axial location, i.e., using merely the single locking and clutching devices 59 and 62 for said given location. To this end, the shaft 48 for drum 3 is in turn carried by a sleeve, rotatably supported by suitable bearing means. The sleeve is carried by arm 50, with freedom for limited axial displacement with respect thereto. Such axial displacement may be obtained by fluid-pressure-operated means such as an annular jack (not shown) having two chambers coaxial with the drum axis, and utilizing shaft 48 as the piston member of the jack. The stroke of this annular jack may be limited by adjustable-wedge stops carried on a rotating drum and acting on a stop fixed to the sleeve; the action on the sleeve may be via bars (not shown). When drum 3 is positioned for application of a belt ply, it has been axially positioned against one of the wedge stops; adjusted rotation of the latter (about its support axis) thus makes it possible to precisely select the desired axial position of the drum, in readiness to receive a belt ply.

The building drum 3 may, of course, be of any type suitable for the reception of belt plies and of the tread. But it is advantageously of the radially retractable variety as described in U.S. application, Ser. No. 717,786, filed Apr. 1, 1968 now abandoned. Generally, it suffices to state that the drum 3 is radially expandable and contractable. The outer periphery of drum 3 is circumferentially grooved and filled with a magnetic elastomeric material, which is magnetized and serves to attract metallic cords of the breaker or belt to the surface of the drum, to aid in maintaining precise alignment of the belt relative to the drum.

The slide which carries the building drum may also be provided with a device 64 for supplying other tire components in a strip, the device 64 being part of a supply and feed head 65 for such component. The device 64 may thus be of the variety described in U.S. application Ser. No. 680,730, filed Nov. 6, 1967 now U.S. Pat. No. 3,595,724. Device 64 is so positioned on slide 53 that the head 65 is in contact with drum 3 when the latter occupies its first end position, i.e., retracted from wheel 15. In addition, it is mounted on a carriage that is axially movable with respect to slide 53, i.e., parallel to the displacement axis of slide 53; such displacement is determined by a jack 66, in such manner that the head 65 may be symmetrically positioned with respect to the median plane of drum 3 when the latter has achieved its located and centered position, appropriate to the wheel 15 with which it is to cooperate.

OPERATION (FIRST-PHASE): PLY PREPARATION

The tire-building apparatus described above functions as follows, with particular reference to the succession of diagrams of FIGS. 4a to 4l. In a first phase the initial lay-up of strips of plies on the ply-preparation wheels is performed by an operator, as part of the set-up of the machine. For this purpose, with shoe 24 in its retracted position away from a particular wheel 15, and with the wheel 15 positioned so that the cutting line (groove 23) begins in the vicinity of the outlet from the centering means 14, the operator feeds the ply strip 9 through the centering means 14 and applies the leading end of the strip to the beginning of the cutting line (FIG. 4a). The ply strip then adheres to wheel 15 by magnetism. From this moment on, an automatic sequence of operations takes place, in the order to be described.

Wheel 15 is partially rotated in the direction indicated by arrow F1 until the lead end of the strip 9 is opposite the free or pointed end of shoe 24; wheel 15 is then immobilized and held in this position by means of its locking device 30, at locating block 31. Shoe 24 is then applied to wheel 15 and the demagnetizing current is cut off, thereby allowing the permanent-magnet field not only to offset the magnetic attraction exerted by the rim of wheel 15 on strip 9, but also to exert a predominating attraction for the strip 9, all while shoe 24 is positioned against the ply strip 9 (FIG. 4b); thus when shoe 24 is moved away from wheel 15, the ply strip 9 will remain applied to and will be carried by the said inner face (FIG. 4c). Wheel 15 is unlocked immediately thereafter, and the normal cycle of ply preparation can begin.

It will be appreciated that most of the drawings are simplified and schematic. This is particularly true as to the pivot axis Y in FIG. 2a and throughout the sequence of FIGS. 4a to 4l, which figures are only intended to show whether the shoe 24 is being applied to the wheel 15 or is retracted therefrom. And of course, when retracted, the effective end of the wheel-adapting concave surface of shoe 24 should be offset from the pivot axis Y, in order that the shoe-retained lead of strip 9 can be radially offset from wheel 15, to the extent D (FIG. 2e), whenever shoe 24 is retracted. The offset or clearance D will be understood to prevent the shoe-retained lead of strip 9 from fouling with any ply material which may have been already transferred to wheel 15; this fact is demonstrated in the simplified illustrations of FIGS. 2c, 2d and 2e, wherein the primary concave arcuate surface of shoe 24 (between the upper pointed end 24' and the lower end shown by dashed lines) is seen to be angularly offset to the extent δ from the pivot axis Y. For this purpose, like arms 24", forming part of the overall shoe structure are laterally offset in opposite directions to straddle and clear the axial width of wheel 15. The clearance D achieved upon shoe retraction, by reason of the angular offset δ, is apparent from a comparison of the simplified fragmentary diagrams of FIGS. 2d and 2e.

In the ply-preparation cycle, wheel 15 is rotated in the direction of arrow F1 to a predetermined position where, by action of a stop control cam (not shown), it is stopped, and its stopped position may then perhaps be slightly corrected as the tapered locating and locking means 32 seeks it home position in the locating block 31", pre-set along means 31' at the side of wheel 15; as previously explained, the angular extent of partial rotation of wheel 15, from its block 31" locked position, to its block 31 locked position, is pre-adjusted to measure precisely the desired length of ply material, for accurate cut off. In this locked position (at block 31"), shoe 24 is re-applied to the wheel, and the demagnetizing elements of shoe 24 are again excited to neutralize the permanent magnets of the shoe; the ply strip 9 is then detached from the shoe and is adhered by magnetism to the rim of wheel 15, with the front or leading end "T" of the ribbon occupying the position shown in FIG. 4d. Shoe 24 is then retracted, its inner face remaining demagnetized; then, after unlocking the wheel, the latter is again incrementally rotated in the direction of arrow F1 (FIG. 4e) to a stop position determined by a cam carried by the wheel, the stopped position being indicated in FIG. 4f. In the course of such rotation, strip 9 will have been wrapped substantially but not entirely around wheel 15 and is magnetically held thereon.

The stopped and newly locked position of the wheel 15 corresponds to the strip-cutting position, in which the cutting line, which is the slant alignment of slot 23 on the wheel, coincides exactly with the displacement path of the knife in the strip-cutting device 26. It will be understood that the length of strip 9 between its front end "T" and the cutting line (designated by the heavy phantom alignment in FIG. 2c) is exactly the length of ply desired (FIG. 4f), once the locking device 30 has been set at block 31. With the wheel locked in this position by means 30, and with the heated blade suitably profiled and sharpened, the cutting device is driven into the strip 9, entering the same in the space between two adjacent wires or cables of the strip. The blade support carriage is then driven along its guide rail in such manner that the blade will traverse the strip from one selvage to the other in a direction parallel to the bias of the wires or cables of the strip. When cutting is thus accomplished, there remains on the wheel a ply with front end "T" and rear end "Q", of correctly measured length.

Figure 4I:
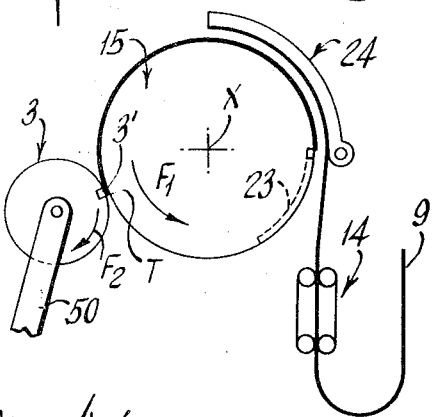

When cutting terminates, the demagnetizing circuit is opened, thereby re-establishing a predominating magnetic field at the said inner face of shoe 24, said predominating field being exclusively operative upon the uncut part of strip 9, namely, the part which will be the lead end of a later pay-out of strip 9. Shoe 24 is then retracted, carrying with it this uncut remainder of strip 9, thereby freeing it from the wheel 15 (FIG. 4g). Wheel 15 is then unlocked (at 30) and again rotated in the direction of arrow F1 (FIG. 4h) until the front end "T" of the freshly cut ply element has come into the position of potential initial contact with drum 3; whereupon drum 3 is carried on its arm 50 into contact with the lead end "T" of the freshly cut strip (FIG. 4i). This event may be said to conclude the cycle of preparation of a ply on wheel 15.

Thus, at the end of this cycle, the ply has been wound on the preparation wheel 15, has been cut to the desired length, is perfectly centered with respect to the median plane of the wheel, and is ready to be applied. As soon as the cut strip has been transferred to drum 3 (in the manner indicated below), wheel 15, shoe 24 and strip 9 are again in the same situation as after the operator had started the cycle to load the shoe (FIG. 4c). A next ply-preparation cycle can begin, the start of the new cycle being controlled by the passage of the rear end "Q" of the preceding ply onto the building drum, as detected and certified by suitable means (not shown).

In nornal operation, each ply-preparation equipment with its wheel 15 need be started only once by the operator, and this can be accomplished when the machine is started up. The complete cycle of ply-preparation, as described, then recycles automatically for each wheel 15 that may be involved, with no other manual intervention except the replacement of an empty ply-strip reel-holding case, as and when needed.

The automatic operation of each ply-preparation device, as described above, namely, the orderly succession and/or synchronizing of movement of the various drive-motor devices and actuators, as well as the working of the various components intervening in the course of the operation, is obtained by means of known combinations of suitable known mechanical, electrical, electromagnetic, electro-pneumatic or electronic means, as will be understood.

OPERATION (SECOND PHASE): BELT BUILDING

The cycle of building a belt from belt plies and treads is performed on the building drum 3, which will have been brought into position to receive the various belt components; in this position, drum 3 is also suitably conditioned, with its radially movable elements radially expanded, and drum 3 is axially centered opposite the first ply-preparation wheel 15, in such manner that the median planes of the wheel and drum coincide. In this position, slide 53 is transversely positioned and slight re-centering or axial correction may result as the applicable locking and centering device 59 is actuated to its home position. When the device 59 is locked, rotary drive for the applicable wheel 15 is coupled to the rotary drive for drum 3, by operation of the pneumatically actuated retractable clutch 62 on slide 53. It will be understood that, prior to clutch engagement at 62, drum 3 will have been automatically brought to a reference angular orientation such that it can readily pick up the lead end "T" of the ply strip on wheel 15; a local permanent-magnet element (designated 3' in FIGS. 4i and 4j) serves this purpose and may be of the nature described more fully in said application Ser. No. 749,810.

Figure 4J:
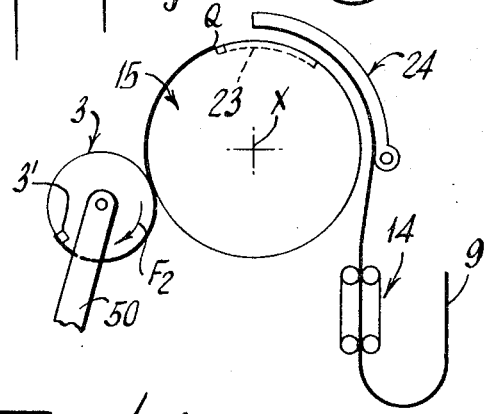
Figure 4K:
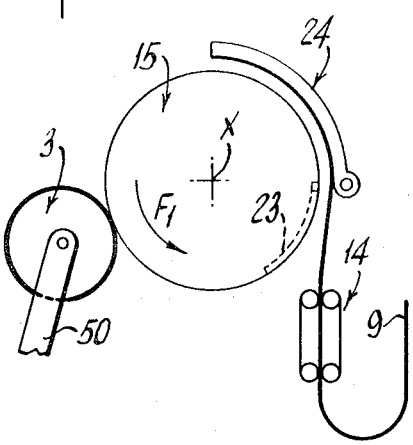
Figure 4L:
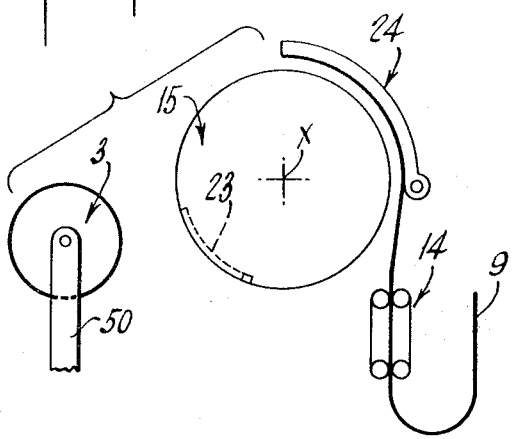

Having thus achieved all necessary axial and angular referencing, arm 50 is pivotally actuated about axis 52 until stopped by contact of bracket 57 against a fixed stop 56, which is so set that drum 3 will advance to a point spaced from wheel 15 in accordance with the thickness of the ply carried by the latter. In this position (FIG. 4i), drum 3 presents to the front end "T" of the ply on wheel 15 a magnetic attraction force, due to circumferential mass of magnetized elastomeric material in its groove; and to start the peel-off of the leading edge "T" from wheel 15, element 3' provides a locally stronger and predominating magnetic-attraction force. Drum 3 is then driven in the direction of arrow F2 around its axis, thus also driving (by means of clutch 62) wheel 15 in the opposite direction (direction of arrow F1). It will be understood that gear ratios relating the drum drive and the wheel drive are selected for kinematically correct no-slip contact, i.e., for strict synchronization of ply handling in the course of transfer from wheel 15 to drum 3. In this way, the ply originally wound on wheel 15 is picked up by drum 3, without undergoing any circumferential stretch or compression, and under conditions of uniform and precisely controlled spacing between drum 3 and wheel 15 (FIG. 4j).

After transfer of the entire ply to the drum 3, that is to say as soon as the rear end "Q" of the said ply has been applied to the drum (FIG. 4k), the latter is stopped, and withdrawn from wheel 15 by rotation of arm 59 about axis 52, into its first end position or retracted position, at which point drum 3 is driven an appropriate fraction of a revolution (e.g., one-half or one-third revolution) so that the operator can inspect the seaming of the two ends "T"–"Q" of the transferred ply. Alternatively, this partial rotation of the drum after ply transfer may be accomplished with the then-loaded drum 3 in its advanced position, adjacent wheel 15, in order to apply uniform wheel pressure over the length of the seam; of course, for such partial further rotation of wheel 15, it will be necessary to use suitable stop means to re-locate the wheel 15 in its correct initial angular position for recycled cutting of a ply strip (FIG. 4c).

Slide 53 is then unlocked, and axially shifted to the next wheel 15, for which the same operations as above are repeated, it being noted that since drum 3 was partially rotated for ply-seaming purposes, the next ply will necessarily overlap the seam or splice location of the preceding inner ply. The same cycle repeats for transfer of further plies from the other ply-preparation wheels 15, until all the plies are transferred and assembled to each other on drum 3, in superposed relation.

In the event that two belt plies are not to be centered on the median plane but are to be placed at the same ply level, as for example in axially spaced relation symmetrically offset with respect to the median plane, slide 53 is held opposite the applicable wheel 15, to permit ply transfer to drum 3 for each of its possible axially shifted offset positions on slide 53, as controlled by the axial displacement actuator 63.

Similarly, when further tire components in strip form are to be placed on the belt, drum 3 is axially shifted for coaction with the head 64, and finally with breaker-transfer means 67, for subsequent assembly to a carcass mechanism. Such transfer mechanism, employing a ring of radially expansible and contractable nature, is disclosed in said applications Ser. No. 717,786 and 764,664. In such operations, it will be understood that a pre-set programmer will insure precise and automatic accomplishment of all necessary axial offsets and angular references.

When the various belt plies as well as the various further tire components have been applied on drum 3, the slide 53 is shifted toward the tread applicator 2, until the median plane of drum 3 coincides with the median plane of the said applicator. In this position of the slide 53, a corresponding device 59 is set in locking position, to obtain strict coincidence of the two applicable median planes; the tread is then applied to the outer belt ply as already indicated above, this application being made at constant pressure, as determined by adjustment of a stop for the actuated condition of means 44-45-47.

The seaming of the two ends of the tread may be controlled by the operator. The tread is then completed and ready for transfer and application to a tire-casing carcass.

The complete belt-building or assembly cycle is seen to be automatic, and the sequence, coordination and synchronization of the various movements of the building drum are all pre-set and follow a program utilizing known combinations of suitable known mechanical, electrical, electromagnetic, electro-pneumatic or electronic means.

The described embodiment is seen to achieve precision-building of tire breakers having any desired multiplicity of metal-wire or cable-reinforced plies. This result is achieved with a minimum of overall width requirements (i.e., length of guide means for accommodating axial displacement of building drum 3), since the various ply-preparation devices can be positioned in close adjacency, as evident in FIG. 1, wherein progressively longer conveyors 12, serving the respective wheels 15, permit axially overlapped and staggered or nested deployment of the web-supply equipments 11 serving the respective conveyors 12. To have thus shortened the axially-indexed displacement requirements for drum 3 is to have inherently achieved important economies in index time between tire-building steps.

The present invention has been described and shown only for a preferred embodiment, and it will be understood that modifications may be made without departing from the scope of the invention.

What is claimed is:

1. Apparatus for cutting to predetermined length successive strips of steel-reinforced tire-breaker web from the lead end of an elongated supply thereof, comprising a magnetic web-transport support surface, a shoe member having a magnetic web-lift support surface positioned locally along said transport surface and conforming to the local contour thereof, magnetic-control means operative to change the relative strengths of magnetic force exerted by said transport surface and by said shoe surface for transiently adhering the web predominantly to one more than to the other of said surfaces and for reversing the transient predominance to the other surface more than to the one, coordinated means for interlaced intermittent displacement (1) of said shoe into and away from adjacency to said transport surface and (2) of said transport surface in a web-advancing direction, said coordinated means including a synchronizing connection to said magnetic-control means; said synchronizing connection being such that, in one cycle of shoe displacement, said magnetic-control means establishes web lift-off from said transport surface during an intermittent displacement of said transport surface and, in another cycle of shoe displacement, said magnetic-control means establishes shoe lift-off from web adhered to said transport surface during an intermittent displacement of said transport surface.

2. Apparatus according to claim 1, in which said magnetic surfaces both include permanent-magnet means.

3. Apparatus according to claim 2, in which one of said magnetic surfaces includes selectively operable magnetic-excitation means for superposing a magnetic field strength on the force of the permanent-magnetic means of said one surface, the selected operation of said last-mentioned means being determined by said magnetic-control means.

4. The method of cutting to predetermined length successive strips of steel-reinforced tire-breaker ply web from the lead end of an elongated supply thereof using a selectively displaceable magnetic web-transport support surface and a shoe member having a magnetic web-lifting support surface locally conforming to the contour of said web-transport support surface, said shoe member being selectively displaceable to a first position of local adjacency of said surfaces and to a second position retracted therefrom to change said adjacency to a widened clearance between said surfaces, which comprises: retaining said lead end between said surfaces while said shoe is in said first position, cutting said lead end from edge to edge at a predetermined lead-end location on said shoe, thereby forming a precisely cut new lead end, controlling the relative strength of magnetization of said surfaces to cause the magnetic strength at said shoe surface to predominate, thereby transiently adhering the new lead end to said shoe, retracting said shoe to remove the new lead end from contact with said transport surface, advancing the displacement of said transport surface while removing the cut-off web piece from said transport surface, moving said shoe to its first position and there changing the control of relative strength of magnetization of said surfaces to cause the magnetic strength at said endless surface to predominate, thereby transferring transient adherence of the new lead end from said shoe to said transport surface and then again retracting said shoe, whereby the new lead end is precisely positioned on said transport surface in clearance with said shoe, advancing the displacement of said transport surface to precisely the extent of said predetermined length while continuing to magnetically adhere said transport surface to the new lead end and to ensuing continuous web, returning said shoe to its first position, and recycling the foregoing steps, whereby for each such cycle a precisely cut new piece of said predetermined length will be transiently made and continuously adhered to said transport surface.

5. The method of claim 4, in which said transport surface is cylindrical and is rigid and circumferentially continuous and in which said steps of advancing displacement are limited rotational advances of the cylindrical surface about its axis.

6. The method of claim 4, in which the step of removing the cut-off piece utilizes a rotatable drum positionable in substantially tangent local proximity to said transport surface, transiently magnetically securing the lead end of the cut-off piece to a take-up location on the periphery of the drum, and then synchronously driving said drum and transport surface at matching surface speeds at the tangent location, whereby the cut-off piece is peeled off the transport surface.

7. The method of claim 4, in which the web is of elastomeric material with reinforcing cords including a plurality of steel cords which are biased uniformly with respect to the longitudinal dimension of the web, and in which the cut off step proceeds on an alignment parallel to the said bias in the region of web cut-off.

8. The method of cutting to predetermined length successive strips of steel-reinforced tire-breaker ply web from the lead end of an elongated supply thereof using a continuous and endless selectively displaceable magnetic surface and a shoe member having a magnetic web-supporting surface locally conforming to the contour of said endless surface and selectively displaceable to a first position of local adjacency of said surfaces and to a second position retracted therefrom to change said adjacency to a widened clearance between said surfaces, said predetermined length being less than the peripheral extent of said endless surface, which comprises: retaining said lead end between said surfaces while said shoe is in said first position, cutting said lead end from edge to edge at a predetermined lead-end location on said shoe, thereby forming a precisely cut new lead end, controlling the relative strength of magnetization of said surfaces to cause the magnetic strength at said shoe surface to predominate, thereby transiently adhering the new lead end to said shoe, retracting said shoe to remove the new lead end from contact with said endless surface, removing the cut-off web piece from said endless surface, advancing the displacement of said endless surface by an amount precisely equal to the extent by which the peripheral extent of said endless surface exceeds said predetermined length, moving said shoe to its first position and there changing the control of relative strength of magnetization of said surfaces to cause the magnetic strength at said endless surface to predominate, thereby transferring transient adherence of the new lead end from said shoe to said endless surface and then again retracting said shoe, whereby the new lead end is precisely positioned on said endless surface in clearance with said shoe, further advancing the displacement of said endless surface to precisely the extent of said predetermined length while continuing to magnetically adhere to said endless surface the new lead end and ensuing continuous web, returning said shoe to its first position, and recycling the foregoing steps, whereby for each such cycle a precisely cut new piece of said predetermined length will be transiently made and continuously adhered to said endless surface.

9. The method of cutting to predetermined length successive strips of steel-reinforced tire-breaker ply web from the lead end of an elongate supply thereof using a selectively rotatable cylindrical member having a magnetic web-transport support surface and a shoe member having a magnetic web-supporting surface locally conforming to the contour of said transport surface and selectively displaceable to a first position of local adjacency of said surfaces and to a second position retracted therefrom to change said adjacency to a widened clearance between said surfaces, said predetermined length being less than the peripheral extent of said transport surface, which comprises: retaining said lead end between said surfaces while said shoe is in said first position, cutting said lead end from edge to edge at a predetermined lead-end location on said shoe, thereby forming a precisely cut new lead end, controlling the relative strength of magnetization of said surfaces to cause the magnetic strength at said shoe surface to predominate, thereby transiently adhering the new lead end to said shoe, retracting said shoe to remove the new lead end from contact with said transport surface, removing the cut-off web piece from said transport surface, advancing the rotary displacement of said cylindrical member by an amount which at the transport surface thereof precisely equals the extent by which the peripheral extent of said transport surface exceeds said predetermined length, moving said shoe to its first position and there changing the control of relative strength of magnetization of said surfaces to cause the magnetic strength at said transport surface to predominate, thereby transferring transient adherence of the new lead end from said shoe to said transport surface and then again retracting said shoe, whereby the new lead end is precisely positioned on said transport surface in clearance with said shoe, further advancing the displacement of said transport surface to precisely the extent of said predetermined length while continuing to magnetically adhere to said transport surface the new lead end and ensuing continuous web, returning said shoe to its first position, and recycling the foregoing steps, whereby for each such cycle a precisely cut new piece of said predetermined length will be transiently made and continuously adhered to said transport surface.

10. Apparatus for cutting to predetermined length successive strips of steel-reinforced tire-breaker web from the lead end of an elongate supply thereof, comprising means for supporting and selectively imparting advancing rotary displacement to a cylindrical magnetic web-transport support surface, a shoe member including a magnetic web-supporting surface locally conforming to the contour of said transport surface, selectively operable positioning means for displacing said shoe member to a first position of local adjacency of said surfaces and to a second position retracted therefrom to change such adjacency to a widened clearance between said surfaces, selectively operable magnetic-control means operative to change the relative strengths of magnetic force exerted by said transport surface and by said shoe surface for transiently adhering the web predominantly to one more than to the other of said surfaces and for reversing the transient predominance of adherence to the other surface more than to the one, first limited-displacement drive means precisely advancing said transport surface to the extent that said peripheral length exceeds said predetermined length, second limited-displacement drive means precisely advancing said transport surface to the extent of said predetermined length, means coordinating the operation of said magnetic-control means to establish predominant adherence of web to said shoe for a first cycle of shoe displacement from said first position to said second position and of return after a dwell at said second position, followed by reversal of predominant adherence for a second such cycle of shoe displacement, said coordinating means controlling a cycle of said first drive means during the dwell of said first shoe cycle and a cycle of said second drive means during the dwell of said second shoe cycle, and web cut-off means operative near said shoe at the conclusion of said second shoe cycle.

11. Apparatus according to claim 10, in which said transport surface is part of a cylindrical member and the means for supporting the same includes a frame member, and locally coacting locating elements on said members to define limits of the rotary displacement advanced by said first drive means.

12. Apparatus according to claim 10, in which said transport surface is part of a cylindrical member and the means for supporting the same includes a frame member, and locally coacting locating elements on said members to define limits of the rotary displacement advanced by said second drive means.

13. Apparatus according to claim 10, in which said transport surface is part of a cylindrical member and the means for supporting the same includes a frame member, and selectively operable interengaging locking elements on said members to define precise limits of the displacement advanced by said first drive means.

14. Apparatus according to claim 10, in which said transport surface is part of a cylindrical member and the means for supporting the same includes a frame member, and selectively operable interengaging locking elements on said members to define precise limits of the displacement advanced by said second drive means.

15. Apparatus according to claim 14, and including a building drum with means for rotating the same and for positioning the same in local tangency with the path of movement of the lead end of the cut-off piece when said cylindrical member is rotated, said drum including magnetic means for transient web-adhesion operative upon contact of said drum with the lead end of the cut-off piece.

16. Apparatus according to claim 15, in which said drum-rotating means includes an element establishing a rotary drive connection to said cylindrical member upon establishing said tangent relation with the lead end of the cut-off piece.

* * * * *